(No Model.)

S. L. JOHNSTON.
MACHINE FOR MAKING LOOM HARNESS STRAPS.

No. 272,055. Patented Feb. 13, 1883.

Witnesses.
E. Planta
F. H. Moore

Inventor
Saml. L. Johnston
by J. H. Adams
Atty.

UNITED STATES PATENT OFFICE.

SAMUEL L. JOHNSTON, OF WALPOLE, MASSACHUSETTS, ASSIGNOR TO JOHN B. ROONEY, OF SAME PLACE.

MACHINE FOR MAKING LOOM-HARNESS STRAPS.

SPECIFICATION forming part of Letters Patent No. 272,055, dated February 13, 1883.

Application filed July 3, 1882. (No model.)

*To all whom it may concern:*

Be it known that I, SAMUEL L. JOHNSTON, of Walpole, in the county of Norfolk and State of Massachusetts, have invented a new and useful Improvement in Machines for Making Loom-Harness Straps, of which the following is a specification.

My invention relates to a machine for making round loom-harness straps; and it consists of two rotary heads provided with knives, the rotary heads being mounted on spindles carried by a pair of jaws, which are caused to open by means of a spring for the insertion of the leather straps to be operated upon, the jaws being then brought toward the straps, so as to cut into the same as desired.

It further consists in a means for feeding the strap through the revolving cutters, (by means of a sliding frame, to which one end of the strap is attached by a gripping appliance;) and, further, in causing the strap to be held in position by means of presser-feet, which are operated by a treadle and withdrawn by a spring.

Figure 1:
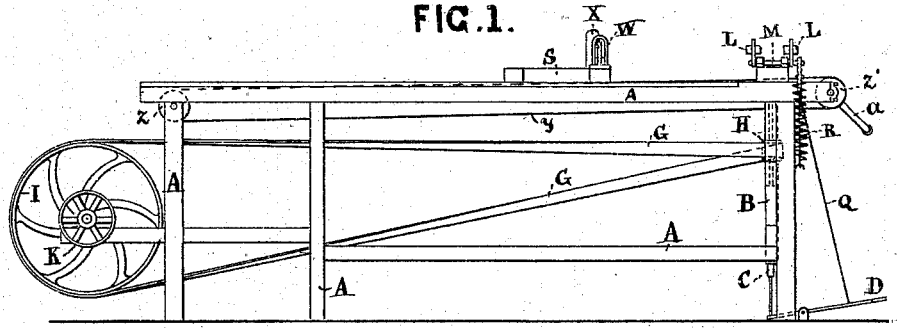
Figure 2:
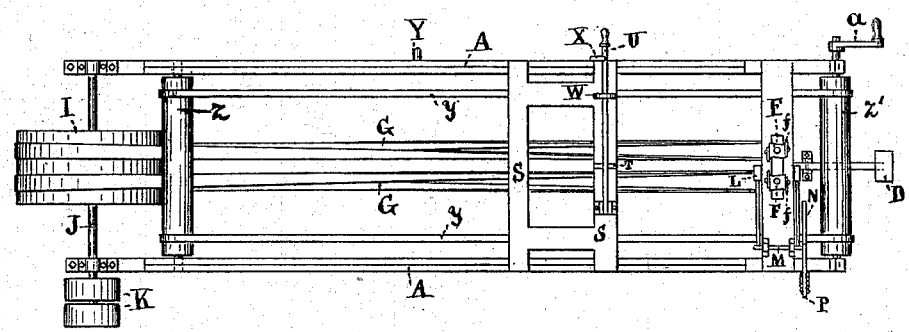
Figure 3:
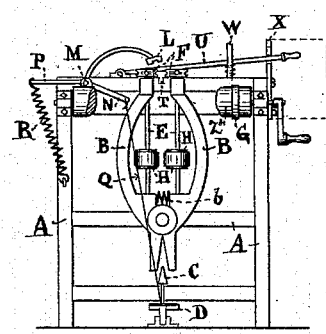
Figure 4:
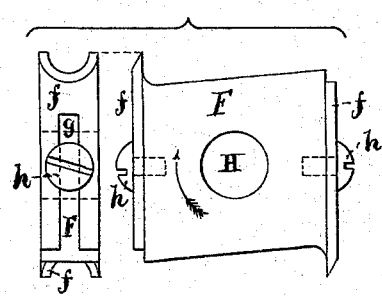

Referring to the accompanying drawings, Figure 1 is a side elevation of a machine embodying my invention. Fig. 2 is a plan or top view of the same. Fig. 3 is a front elevation. Fig. 4 is a view of one of the cutters on an enlarged scale.

A is the frame of the machine, at the front of which are hinged or jointed the jaws B, the lower arms of which are operated by a wedge-shaped attachment, C, on the treadle D, so that when the treadle D is depressed the piece C enters between the lower arms of the jaws B and forces them apart, thus bringing the upper arms of the jaws toward each other, and when the treadle D is released the jaws are forced apart by means of a spiral or other spring, $b$. These jaws B carry the spindles E, on which are fitted the rotary heads F, to which are secured by means of screws the knives $f$. The spindles E, together with the heads and cutters, are caused to revolve by means of belts G, which pass over the pulleys H on the spindles E, and over the drum I on the counter-shaft J, which counter-shaft also carries the fast and loose pulleys K, which are driven from any suitable motive power. The cutting-edges of the knives $f$ are made rounded or hollowed out, so as to cut a round surface upon the strap, and are also made with slots $g$, through which the screw $h$ passes, to hold them in position on the revolving head F.

L L are presser-feet connected to the short shaft M on the top of the frame of the machine.

To the shaft M is connected the lever N P, one arm, N, of which is connected by cord Q to the treadle D, so that when the treadle D is depressed the presser-feet L are brought into contact with and cause a tension on the strap being operated upon.

To the outer arm, P, of the lever is attached a spring, R, which is also connected to the frame of the machine, so that when the pressure is removed from the treadle D the spring R will draw down the arm P and raise the presser-feet L off the strap.

S is a sliding frame, which is guided on a V-shaped projection, or it may be a depression on the upper surface of the frame A. The front of this sliding frame S is provided with a slot, T, into which one end of the belt to be operated upon is inserted, and is held there by means of the hand-lever U, which presses upon and jams the end of the belt in the slot T. The lever U is held up in its normal position by means of a spiral or other spring in the guide W, and when depressed to hold a strap is held by a notched bar or catch, X, in one of the teeth of which the lever U is held. The bar X is attached to the side of the sliding frame S by means of a screw, and has an extended arm, $s$, which, when the sliding frame has traveled the required distance, will strike against a stop, Y, and throw the upper end of the notched bar X over, and thus release the lever U, which is then forced up by the spring in the guide W, and thus releases the strap that has been operated upon. The stop Y is made adjustable on the frame A and fixed according to the length of the strap to be operated upon. The sliding frame S is driven by two bands, straps, or cords, $y$, connected to the same and passing over pulleys or rollers $z$ $z'$, the roller $z'$ being turned by means of the crank $a$. In Fig. 3 part of the roller $z'$ is shown broken away, so that the jaws B may be more clearly seen.

The operation is as follows: A strap is passed between the rotary knives $f$ and the end secured in the slot T of the sliding frame upon depressing the lever U and placing it in a notch in the bar X. The treadle D is then depressed, which brings the cutting-edges of the knives $f$ into contact with the strap, and at the same time lowers the presser-feet L, so as to bear upon the strap. The crank $a$ is then turned, which causes the sliding frame to travel from the front of the machine, and thus draw the belt between the rotary cutters. When the sliding table has traveled the desired distance the extended arm $s$ of lever X comes in contact with the stop Y and the strap is released. The pressure is then removed from the treadle D and the crank $a$ turned in the reverse direction, so as to bring the sliding frame up toward the revolving cutters, when the machine is ready to receive and operate upon another strap.

What I claim as my invention is—

1. The rotating head F, provided with knives $f$, in combination with the expanding jaws B B, substantially as and for the purpose set forth.

2. The sliding frame S, provided with a gripping device, in combination with the cutters $f$ and the rotating head F, substantially as and for the purpose specified.

3. The presser-feet L L, connected to the shaft M, in combination with the lever N P, the cord Q, and treadle D, substantially as and for the purpose set forth.

4. The combination, with the sliding frame S, of the lever X and stop Y, substantially as and for the purpose set forth.

In testimony whereof I have signed my name to this specification in the presence of two subscribing witnesses.

SAMUEL L. JOHNSTON.

Witnesses:
 GILBERT HAWKES,
 E. PLANTA.